United States Patent
Brunson

(10) Patent No.: US 9,876,912 B2
(45) Date of Patent: Jan. 23, 2018

(54) PARALLEL FORKING WITH AOR CHAINING

(71) Applicant: Gordon R. Brunson, Broomfield, CO (US)

(72) Inventor: Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 553 days.

(21) Appl. No.: 13/894,129

(22) Filed: May 14, 2013

(65) Prior Publication Data

US 2013/0301822 A1  Nov. 14, 2013

Related U.S. Application Data

(60) Provisional application No. 61/646,749, filed on May 14, 2012.

(51) Int. Cl.
*H04M 3/54* (2006.01)
*H04L 29/06* (2006.01)

(52) U.S. Cl.
CPC ........ *H04M 3/543* (2013.01); *H04L 65/1006* (2013.01); *H04L 65/1096* (2013.01)

(58) Field of Classification Search
USPC ............. 379/211.03, 211.04, 213.01, 214.01
See application file for complete search history.

(56) References Cited

U.S. PATENT DOCUMENTS

| 8,032,624 | B2 | 10/2011 | Brunson et al. |
| 2007/0288754 | A1 | 12/2007 | Kaji et al. |
| 2010/0325249 | A1* | 12/2010 | Brunson et al. ............ 709/221 |
| 2011/0066707 | A1* | 3/2011 | Brunson et al. ............ 709/221 |

FOREIGN PATENT DOCUMENTS

| EP | 2224664 | 9/2010 |
| WO | WO 2010/015893 | 2/2010 |

OTHER PUBLICATIONS

Handley et al. "RFC 2543 SIP: Session Initiation Protocol," Mar. 1999, 154 pages.
Nortel; Personal Agent User Guide; Mar. 2009; MCS 5100 Release 4.0 Standard 02.02 NN42020-100; 104 pages.
SIP Procedures for Registration and Routing; Internet—http://fengnet.com/book/voip/ch12lev1sec4.html; 7 pgs.
Extended Search Report for European Patent Application No. 13167703.1, dated Aug. 1, 2013 9 pages.

* cited by examiner

*Primary Examiner* — Antim Shah
(74) *Attorney, Agent, or Firm* — Sheridan Ross P.C.

(57) ABSTRACT

The concept of chained parallel forking is introduced. Addresses of record are included in a contactee's contact resolution preferences to enable an incoming INVITE message to be routed to one or more users as well as other devices, per the contactee's contact resolution preferences. A communication system configured to execute the chained parallel forking contact resolution process is also described.

20 Claims, 6 Drawing Sheets

PARALLEL FORKING WITH AOR CHAINING

CROSS REFERENCE TO RELATED APPLICATION

The present application claims the benefits of U.S. Provisional Application Ser. No. 61/646,749, filed May 14, 2012, entitled "PARALLEL FORKING WITH AOR CHAINING", which is incorporated herein by this reference in its entirety.

FIELD OF THE DISCLOSURE

The disclosure relates generally to communications and specifically Session Initiation Protocol communications.

BACKGROUND

Session Initiation Protocol ("SIP") is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AoR) as a single unifying public address for all communications. Thus, in a world of SIP-enhanced communications, a user's AOR becomes their single address that links the user to all of the communication devices associated with the user. Using this AOR, a contactor can reach any one of the user's communication devices, also referred to as User Agents ("UAs") without having to know each of the unique device addresses or phone numbers.

Many SIP communications are enhanced by virtue of the fact that an application is inserted or included into the communication session during the establishment of that session. The incorporation of applications into a communication session is typically referred to as application sequencing because the applications are sequentially invoked during the establishment of the communication session. In some instances the applications are owned and operated by an enterprise that is administering the SIP network. In some instances, the applications may be provided by third-party vendors. In either event, the traditional way in which applications were included in the communication session was during the communication session establishment stage so that these applications can insert themselves into the signaling and media path of the communication session.

Exemplary types of applications that may be utilized for a communication session include, without limitation, call recording applications, communication log services, conferencing applications, security applications, encryption applications, collaboration applications, whiteboard applications, mobility applications, presence applications, media applications, messaging applications, bridging applications, and any other type of application that can supplement or enhance communications.

Parallel forking is available as part of contact resolution to enable a user to alert one or more communication devices. Current parallel forking solutions allow a user to define only communication devices that should be alerted. In other words, most users can currently set a preference to have his or her office phone ring and his or her cell phone ring when a call is directed to them. Unfortunately, this is where most call resolution solutions end.

SUMMARY

It is, therefore, one aspect of the present disclosure to provide the concept of using an AoR as a contact resolution preference.

In one embodiment, a method is provided, which includes:

(a) receiving a request from a first user to establish a communication session between a first communication device associated with the first user and a second communication device associated with a second user; and (b) determining that an address of record of a third user different from the first and second users is referenced in a set of contact resolution preferences of the second user.

In one configuration, a communications server is provided that is capable of performing one or more of the following functions:

(a) when the communications server is not authoritative for the address of record of the third user, forwarding the request to the address of record for the third user; and (b) when the communications server is authoritative for the address of record for the third user, performing contact resolution with respect to the addresses of record of the second and third users.

Feature preference applications for each user participant, whether on the origination- or termination-side of the contact session, can be applied during contact resolution.

In one configuration, the request to the AoR for the third user is forwarded and, the forwarded request comprises in a source field an address of record of the first user and in a destination field an address of record of the third user.

The contents of a user's contact resolution preferences can be maintained in any type of data structure, such as a table, for example. The contact resolution preference table can vary based on a number of factors. For example, the user associated with a set of contact resolution preferences in the table can have a first set of contact resolution preferences for a first media type, and a second set of contact resolution preferences for a second different media type.

The present disclosure can allow a user to define another user as a call resolution destination, thereby enabling parallel forking to the called user and the called user's backup user (e.g., assistant supervisor, etc.).

The disclosure can be used in a number of ways. In one implementation, a different type of coverage option is provided that enables a user to have his or her communication device ring as well as an assistant's communication device.

The term "address of record" or "address or record URI" ("AoR") refers to a URI that corresponds to a user. Unlike a contact URI (or device URI), a request sent to an AoR requires database lookups and service and feature operations and can result the request being sent to one or more end (communication) devices. An AoR is usually used in TO and FROM header fields. This is a common way to reach a person and is suitable for storing in address books and in returning missed calls.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "contact URI" refers to a device Universal Resource Indicator ("URI"). A device URI is typically in a CONTACT header field and is associated with a particular user for a period of time. An address of record URI can be related or bound to a contact URI.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The term "uniform resource identifier" (URI) is a string of characters used to identify a name or a resource.

The term "uniform resource locator" or "universal resource locator" (URL) is a specific character string that constitutes a reference to an Internet resource.

A "user agent" refers to a Session Initiation Protocol ("SIP")-enabled endpoint device. The user agent takes direction and/or input from a user and acts as an agent on behalf of the user to set up and tear down media sessions.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize anchor points.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
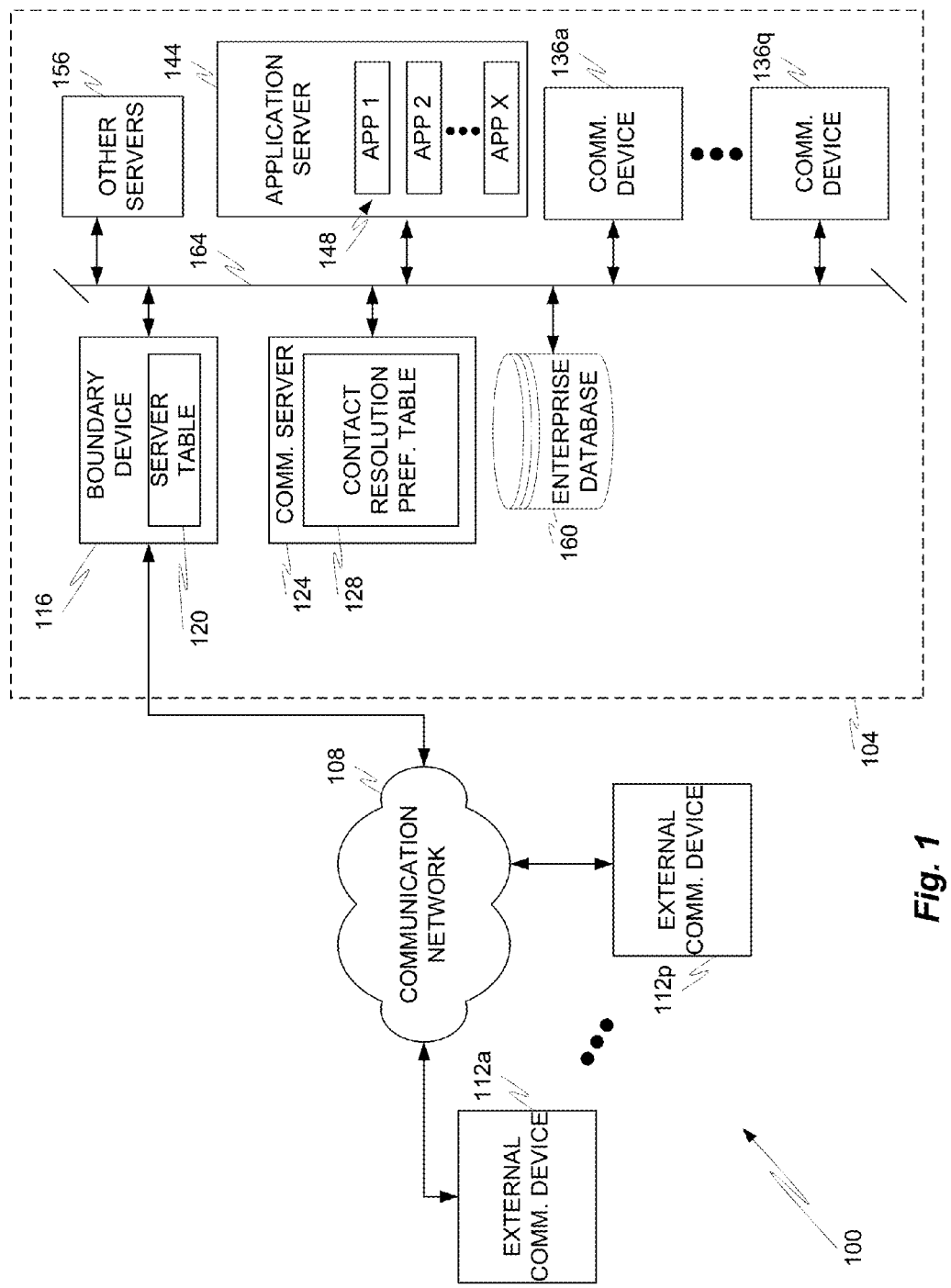
FIG. 1 is block diagram depicting a communication system in accordance with embodiments of the present disclosure.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112a-p.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The external communication devices 112a-p are generally referred to as "external" because they are either not under the direct control of the enterprise administering the enterprise network 104 or have a decreased level of trust with the enterprise network 104 as compared with communication devices 136a-q that are within the enterprise network 104. Exemplary types of external communication devices 112a-p include, without limitation, cellular phones, laptops, Personal Computers (PCs), Personal Digital Assistants (PDAs), digital phones, analog phones, and the like.

The enterprise network 104 may include a boundary device 116 including a server table 120, a communications server 124 including a contact resolution preference table 128, one or more internal communication devices 136a-q, one or more application servers 144 which may be capable of providing one or multiple applications 148, a number of other servers 156, and an enterprise database 160, all of which are interconnected by a (trusted or secure or private)

Local Area Network (LAN) 164. Some or all of the functions depicted in FIG. 1 may be co-hosted and/or co-resident on a single server. Alternatively or additionally, some or all of the components of the enterprise network 104 may be made available via cloud computing technologies. For instance, some or all functions of the servers may be made available from a cluster of servers that may or may not necessarily be co-located with the communication devices 136a-q. In other words, the enterprise network 104 may be partially cloud-based and access to the resources of the cloud-based network may be obtained through the communication network 108. The depiction of components in FIG. 1 is generally intended to be a logical depiction of the components of the system 100.

In some embodiments, network boundary device 116 is responsible for initially routing communications within the enterprise network 104 to the communications server 124 responsible for servicing a particular user involved in the communication. For example, if a first enterprise user is being called by an external communication device 112a-p, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136a-q) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

The communications server 124 can include a Private Branch eXchange (PBX), an enterprise switch, an enterprise server, combinations thereof, or other type of telecommunications system switch or server. The communications server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120.

Additionally, multiple servers 124 can support a common user community. For example, in geo-redundant and other applications where users aren't necessarily bound to a single application server, there may be a cluster of equivalent servers where a user can be serviced by any server in the cluster.

Each communications server 124 may include a contact resolution preference table 128 mapping, for a corresponding (enterprise subscriber) user, a set of contact resolution preferences to be invoked for an incoming contact for each user for whom it is authoritative. Contact resolution preferences reference contact information, particularly Universal Resource Indicators ("URIs"), such as contact URIs and addresses of record. As will be appreciated, the Session Initiation Protocol ("SIP") uses a URI addressing schema. SIP URIs can handle telephone numbers transport parameters, and a number of other items. The SIP URI is a name that is commonly resolved to an IP address by using SIP proxy server and DNS lookups at the time of the call.

Figure 2:
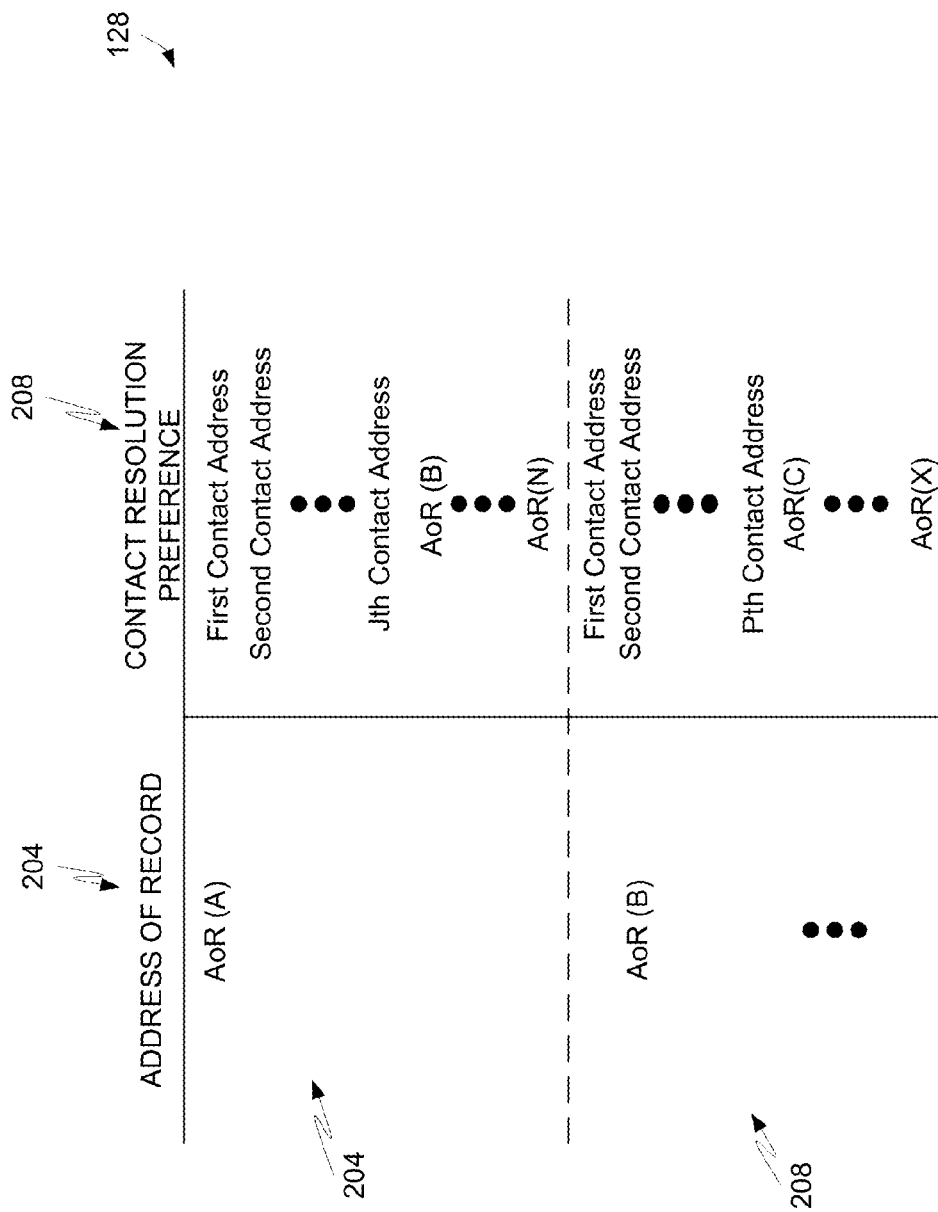
FIG. 2 is a diagram depicting an embodiment of a contact resolution preference table.

With reference to FIG. 2, a simplified contact resolution preference table 128 is depicted. The table 128 includes, for each referenced address of record 204 (which typically corresponds to an enterprise subscriber) a set of corresponding contact resolution preferences 208. For example, user A has a corresponding address of record AoR(A) and has a corresponding set of contact resolution preferences including first, second, . . . Jth contact addresses (each of which corresponds to a URI of a communication device typically associated with user A) and addresses of record AoR (B) (which is the address of record for user B) . . . address of record AoR(N) (which is the address of record for user N). User B having address of record AoR(B) has a corresponding set of contact resolution preferences 208 including first, second, . . . Pth contact addresses (each of which corresponds to a URI of a communication device typically associated with user B) and addresses of record AoR (C) (which is the address of record for user C) . . . address of record AoR(X) (which is the address of record for user X). In the example, the addresses of record are chained in that user B's and other users' addresses of record appear in the set of contact resolution preferences of user A and user C's and other users' addresses of record appear in the set of contact resolution preferences of user B.

Each communications server 124 also includes a feature preference table (not shown) containing the communication feature preferences for each user for which it is authoritative. The communications preferences for a particular user are referenced by the authoritative communications server 124 for the user to determine which, if any, features should be incorporated into a communication session for the user. The communications server 124 can actually provide communication features directly into the communication session or determine an application sequence which will be invoked during set-up and used during the communication session.

The tables may be provisioned by users and/or by administrative personnel.

It is also to be understood that any data structure can be used to render the various preference tables, including, without limitation, primitive, composite, or abstract data types, linear data structures, tree data structures, hashes, graphs, and the like.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The other servers 156 may comprise email servers, voicemail servers, calendaring servers, conferencing servers, and other types of servers known to provide particular services to client devices. In some embodiments, the other servers 156 may also be considered application servers 144, which provide one or more applications for use in a communication session.

The internal communication devices 136 can be similar or identical to the external communication devices 112, except they are provisioned, and often owned, by the enterprise. Exemplary types of communication devices 112 include, without limitation, any capable phone, hardphone, softphone and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

In accordance with at least some embodiments, the communications server 124 determines an application sequence and causes one or more applications 148 to be sequenced into a communication session followed by contact resolution in which the inbound or outbound contact is routed to selected communication device URIs and/or addresses of record. In particular, the communications server 124 is configured to analyze a particular user's communication preferences and invoke the necessary applications and routing to fulfill such preferences. Once an application sequence is determined by the communications server 124, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communications server 124 to identify the next application in the application sequence or passes the communication-establishing message directly to a second application in the application sequence. Alternatively, or in addition, the message may be redirected, rejected, or the like. Moreover, parties and/or media servers may be added to the call by an application.

Figure 3:
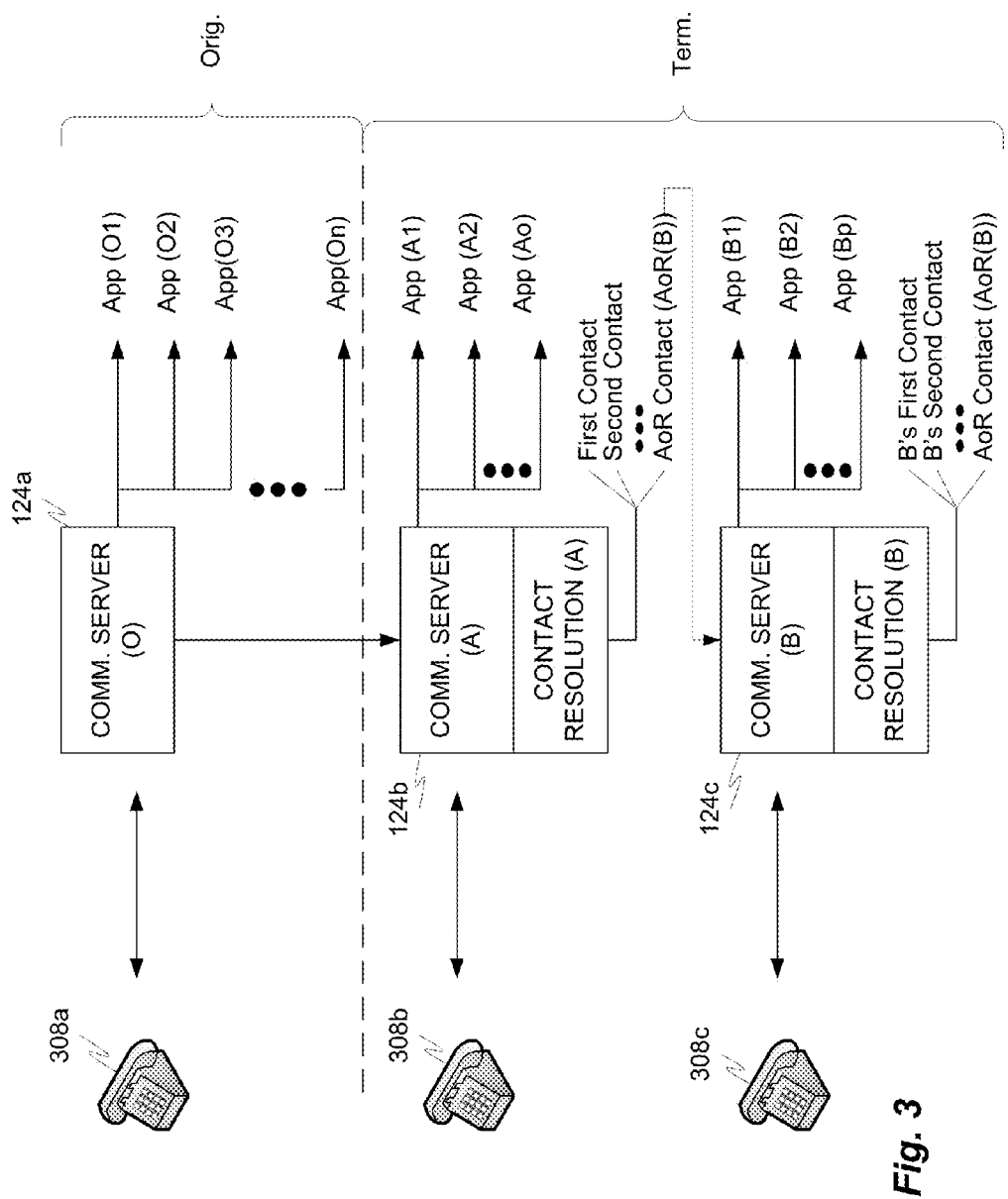
FIG. 3 is a diagram depicting an instantiation of a contact session resulting from the contact resolution preference table of FIG. 2.
Figure 4:
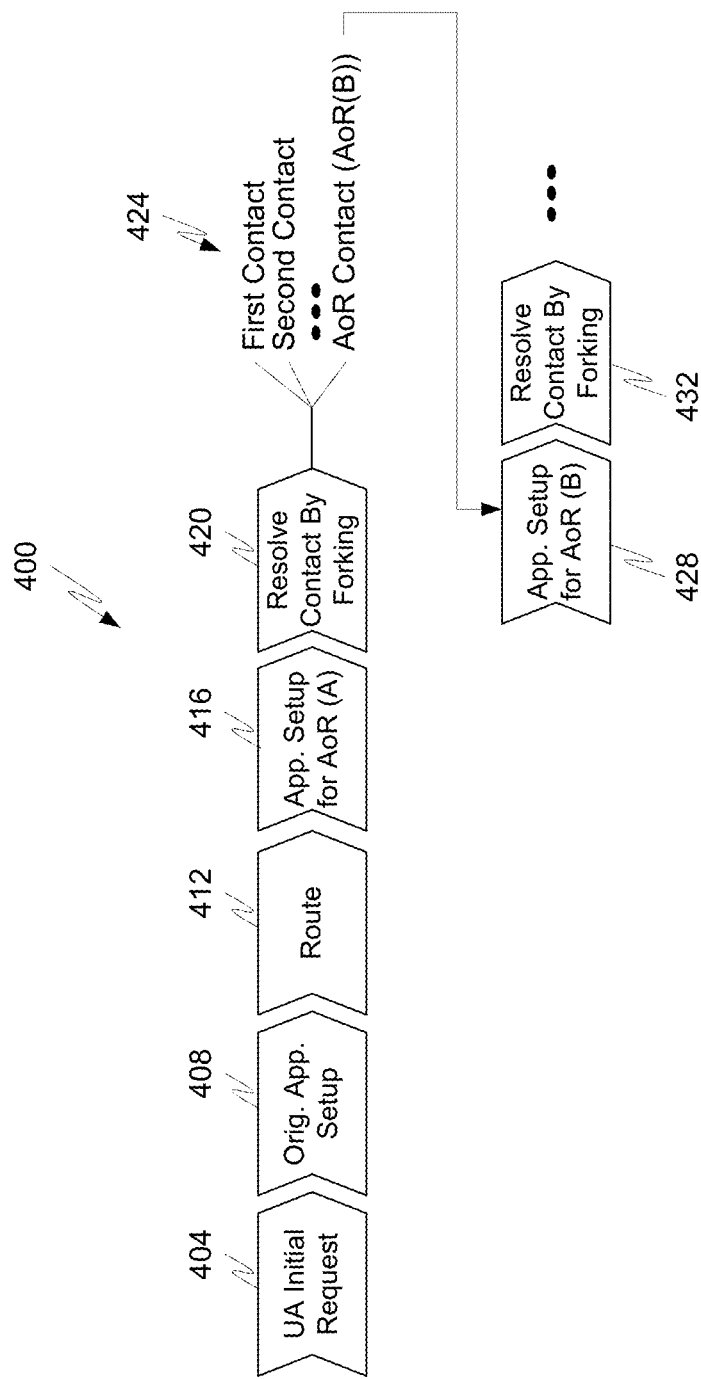
FIG. 4 is a diagram depicting a logical call model in accordance with embodiments of the present disclosure.

FIGS. 3 and 4 depict a call origination and termination example based, in part, on the data structures in FIG. 2. In the example, the call originator is user O. As can be seen in FIG. 3, user O originates a call to user A via communication device 308*a* (which may be internal or external to the enterprise network 104) by originating a UA initial request step 404 (e.g., INVITE) directed to user A. In response, communications server (O) 124*a* (which is authoritative for administering user O's feature preferences) sets up an application sequence App(O1), App(O2), App(O3), . . . App(On) (step 408) in the control signaling channel on an origination-side of the session. The boundary device 116 for user O then routes the contact to user A. The UA initial request, in the form of an INVITE, is then routed to a communications server (A) 124*b* that is authoritative for administering the preferences of user A (step 412). In response, the communications server (A) 124*b* sets up an application sequence App(A1), App(A2), App(A3), . . . App(Ao) (step 416) in the control signaling channel on a termination side of the session. Thereafter, a contact resolution step occurs (step 424). In this step, called user (e.g., callee) may have contact resolution preferences for a single device (e.g., a single contact number), for multiple devices (e.g., multiple contact numbers), for a single AoR (e.g., defining a different user as a contact resolution preference), for multiple AoRs (e.g., multiple identified users), or combinations thereof. If the called user only defines devices in their contact resolution preferences, then the contact resolution occurs in a known fashion. However, if the called user has at least one AoR in their contact resolution preferences, then the contact is then resolved to the first, second, . . . Jth contact addresses and the referenced addresses of record, which, in the depicted example, the contact resolution includes sending requests (e.g., as an INVITE message) to each of user A's contact addresses, one of which may be the AoR of another user (e.g., user B).

As depicted in FIGS. 3 and 4, if B's AoR is encountered as a contact of user A, then term sequencing will begin for user B (step 428), effectively extending the set of applications sequenced into the session. As will be discussed in further detail below, it may also be possible to limit the inclusion of additional applications if user A and user B both have their authoritative communication servers 124*b*, 124*c*, respectively, being operated within a common domain. FIGS. 3 and 4 also depict that the chaining of AoRs may extend beyond user B, during contact resolution for user B (step 432).

When forking occurs, an INVITE message may be transmitted to each device and/or AoR defined in a user's contact resolution preferences. Whichever device answers the communication request first will be connected with the calling device 308*a*. Said another way, a race condition exists as to each contact defined for user A's contact resolution preferences. If one of user A's devices answers first, then the requests transmitted to the other devices will be canceled. Likewise, if user A defined user B in their contact resolution preferences, then it may be one of user B's devices that wins the race and is connected with the calling device 308*a*, while all other devices have their INVITE cancelled.

An advantage of incorporating addresses of record in the contact resolution preference field of the table 128 is that the alerting of a call may be extended to include not only the termination applications and devices belonging to user A, but also the termination applications and devices belonging to other users as well. All terminating applications for user A may remain in the session even as the opportunity to pick-up the session is extended to applications and devices of user B, C, etc.

As will be appreciated, simply using contact addresses, or communication device URIs, in the contact resolution preference field does not necessarily apply the feature preferences of the user corresponding to the contact address during termination or enable a presence determination to direct the contact to a currently registered communication device of a contactee.

The feature preference applications included in a particular application sequence are generally included to accommodate the user's feature preferences. Applications may vary according to media-type, function, and the like. Exemplary types of applications include, without limitation, an EC-500™ (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, automated attendant applications, and any other type of application that can supplement or enhance communications. Additionally, one, two, three, or more applications of a given type can be included in a single application sequence without departing from the scope of the present invention.

Although only one application server 144 is depicted, one skilled in the art will appreciate the one, two, three, or more applications servers 144 can be provided and each server may be configured to provide one or more applications. The applications provided by a particular application server 144 may vary depending upon the capabilities of the server 144 and, in the event that a particular application server 144 comprises a set of applications 148, one, some, or all of the applications in that set of applications 148 may be included in a particular application sequence. There is no requirement, however, that all applications in a set of applications 148 be included in an application sequence and there is no requirement as to the order in which applications are included in the application sequence. Rather, the application sequence is usually determined based on a user's communication preferences, which can be found in a feature preference table. Alternatively, or in addition, the applications that appear in a user's sequence vector and their order within that vector may be determined by a system administrator to satisfy business requirements.

Moreover, the contact resolution and feature preference appearances and ordering can vary based on the media type(s) that are being used in the communication session. For instance, a user may have a first set of contact resolution and feature preferences for voice-based communications, a second (different) set of contact resolution and feature preferences for video-based communications, and a third (yet different) set of contact resolution and feature preferences for text-based communications. Additionally, a user may have contact resolution and feature preferences defining preferred media types and rules for converting communication sessions from one media type to another different media type. Still further, a user may have contact resolution and feature preferences defining the manner in which multimedia communications are established and conducted.

Figure 5:
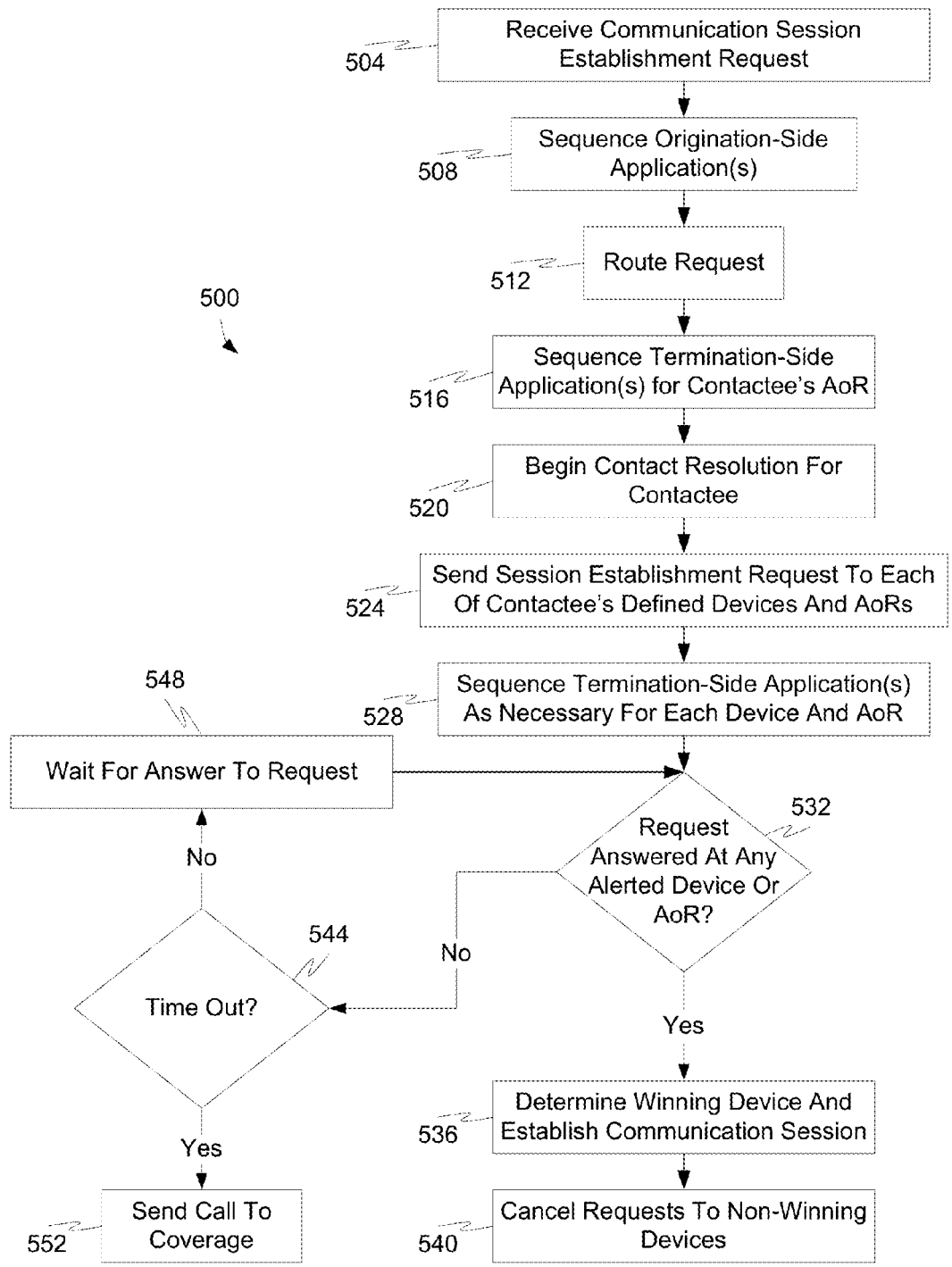
FIG. 5 is a flow diagram depicting a communication method in accordance with embodiments of the present disclosure.

With reference now to FIG. 5, a communication method will be described in accordance with at least some embodiments of the present disclosure. The method 500 begins when a request to establish a communication session is received at a communication server 124 (step 504). The request may correspond to an INVITE message that is transmitted by a first user (e.g., user O) using a first communication device to a second user (e.g., user A). The communication server 124 that receives the request may correspond to a server that is authoritative for the calling user (e.g., user O).

The method continues with the communication server 124 sequencing the origination-side applications for the calling user (step 508). Once all of the applications have been sequenced for the calling user, the communication server 124 routes the request to a communication server 124 that is authoritative for the called user (e.g., user A) (step 512). The communication server 124 authoritative for the called user may then sequence the termination-side applications for the called user (step 516). After the appropriate applications have been sequenced by the communication server 124, the communication server 124 begins contact resolution for the called user (step 520).

During the contact resolution phase, the communication server 124 may refer to the called user's communication preferences as defined in the table 128 and send a session establishment request to each of the called user's defined devices and AoRs (step 524). In the event that a request is transmitted to a different AoR (e.g., an AoR of user B), then it may be necessary to sequence additional termination-side applications per the communication preferences of the user associated with the chained AoR (step 528).

The method continues with the communication server 124 that performed the contact resolution determining whether any of the alerted devices have answered the request (step 532). In other words, the communication server 124 awaits an answer from one of the alerted devices, perhaps in the form of a 2000K message. If the query of step 532 is answered affirmatively, then the communication server 124 determines the winning device and facilitates the establishment of a communication session between the calling device and the device that answered the request first (step 536). Thereafter or simultaneous with step 536, the communication server 124 cancels the requests that were sent to the non-winning devices (step 540).

Referring back to step 532, if the communication server 124 does not receive an answer, the method continues with the communication server 124 determining if the request has expired or timed-out (step 544). If not, then the communication server 124 will continue waiting for an answer to the request (step 548). If the request has timed out, then the communication server 124 sends the call to coverage for the called user (step 552). For example, the call may be sent to voicemail, an assistant, or any other coverage defined by the called user.

Figure 6:
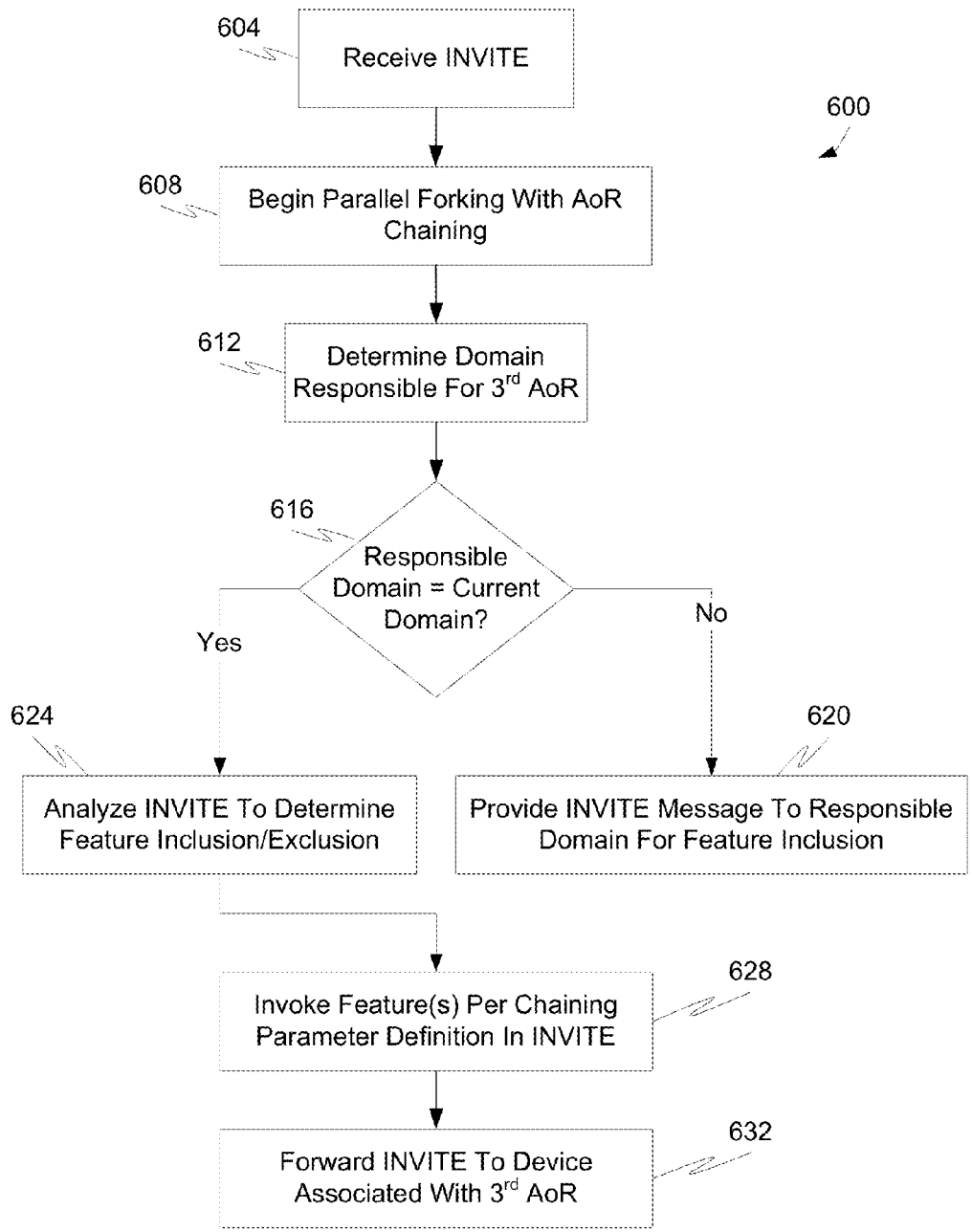
FIG. 6 is a flow diagram depicting a parallel forking method in accordance with embodiments of the present disclosure.

With reference now to FIG. 6, a method of parallel forking with AoR chaining will be described in accordance with embodiments of the present disclosure. The method 600 begins when a communication server 124 receives an INVITE for a called user (e.g., user A) (step 604). The communication server 124 begins a process of parallel forking with AoR chaining (step 608). This process is initiated, in some embodiments, because the contact resolution preferences of the called user identify at least one AoR other than the called user's AoR (e.g., an AoR of user B).

The communication server 124 continues by determining whether the AoR of user B is within the same domain as the AoR of the called user (steps 612 and 616). In particular, if both the called user (e.g., user A) and the chained user (e.g., user B) are not within the same domain (e.g., both users do not have authoritative communication servers 124 within a common enterprise network 104), then the communication server 124 for the called user will pass the INVITE message to the appropriate domain where further features/applications can be invoked per the preferences of the chained user and/or the network of the chained user (step 620).

If, however, both the called user and the chained user are within the same domain (e.g., both users have authoritative communication servers 124 within a common enterprise network 104), then the communication server 124 for the called user and/or the communication server 124 for the chained user can analyze the INVITE message to determine whether any special feature inclusion/exclusion should be performed (step 624). More specifically, if the chained user is within the same domain as the called user, then it may be advantageous to bypass one or more applications or features that would have been otherwise sequenced for the chained user. For instance, if an application has already been sequenced for the called user and the chained user has the same application defined in their communication preferences, then it may not be necessary to re-sequence another version of the same application into the communication session. In some embodiments, it may be desirable to bypass all applications of the chained user and pass the INVITE message directly to the device of the chained user.

In some embodiments, the feature inclusion/exclusion preferences may be maintained and defined as a parameter within the INVITE message. As a non-limiting example, the INVITE message may contain the following information: INVITE(AoR of chained user; device for chained user; chaining parameter(s)). The AoR of the chained user may be defined in the conventional manner (e.g., userB@domain.com). The device for the chained user may correspond to a globally routable UA URI (GRUU) that identifies a device to alert for the chained user. The chaining parameter may define which application(s) are bypassed by the INVITE and/or which additional applications are included in the application sequence for the call. By including the chaining parameter in the INVITE, the communication server 124 is enabled to know that the alert is being received as part of a chained alert and should be handled appropriately. For instance, the chaining parameter may define that the communication server 124 for the chained user should not start a new timer or perform any other functions that have already been performed by the communication server 124 for the called user. The value provided by including the chaining parameter is that a larger network with many communication servers 124 can get information from the alerting to determine whether additional features are required or not for a chained alert.

The communication server 124 for the chained user can then invoke or bypass one or more applications/features per the chaining parameter definition in the INVITE message (step 628) and then forward the INVITE to the device(s) associated with the chained AoR in a contact resolution phase for the chained AoR (step 632).

While the above-described flowcharts have been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this disclosure can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present disclosure, systems, apparatuses and methods for creating and utilizing anchor points in connection with a communication session. While this disclosure has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:

1. A method, comprising:
   receiving, by a communication server authoritative for a second user, a request from a first user to establish a communication session between at least a first communication device associated with the first user and a second communication device associated with a second user;

determining, by the communication server authoritative for the second user, that an address of record of a third user different from the first and second users is referenced in a set of contact resolution preferences of the second user;
sequencing or bypassing one or more applications in a set of contact resolution preferences for the third user based on the address of record of the third user referenced in the contract resolution preferences of the second user; and
referencing, by the communication server authoritative for the second user and as part of setting up a communication session with the first user, one or more chaining parameters in the request to determine whether or not to include or bypass one or more applications for the third user, wherein the one or more chaining parameters define that at least one application for the third user should be bypassed and wherein the at least one application that is bypassed for the third user is sequenced in response to determining that the second user's communication preferences require the at least one application.

2. The method of claim 1, further comprising:
applying, by the communication server authoritative for the second user and as part of setting up a communication session with the first user, a feature preference application associated with the second user.

3. The method of claim 2, further comprising:
when the communication server authoritative for the second user is also authoritative for the address of record for the third user, performing contact resolution with respect to the addresses of record of the second and third users.

4. The method of claim 2, wherein the feature preference application associated with the second user comprises one or more of an extension to cellular application, a call setup application, a voice application, a video application, a text application, a call recording application, a communication log service, a security application, an encryption application, a mobility application, a media application, or a bridging application.

5. The method of claim 4, wherein the feature preference application associated with the second user comprises at least the cellular application.

6. The method of claim 4, wherein the feature preference application associated with the second user comprises at least the call setup application.

7. The method of claim 4, wherein the feature preference application associated with the second user comprises at least one of the voice application, the video application, or the text application.

8. The method of claim 4, wherein the feature preference application associated with the second user comprises at least the communication log service.

9. The method of claim 4, wherein the feature preference application associated with the second user comprises at least one of the security application or the encryption application.

10. The method of claim 4, wherein the feature preference application associated with the second user comprises at least one of the mobility application or the media application.

11. The method of claim 4, wherein the feature preference application associated with the second user comprises at least the bridging application.

12. The method of claim 1, further comprising:
determining that a communication server authoritative for the third user and the communication server authoritative for the second user are not within a common domain; and
forwarding the request from the communication server authoritative for the second user to the communication server authoritative for the third user.

13. The method of claim 1, wherein the second user has a first set of contact resolution preferences for a first media type and a second different set of contact resolution preferences for a second media type.

14. The method of claim 1, when the communication server authoritative for the second user is also authoritative for the address of record for the third user and further comprising: performing contact resolution with respect to the addresses of record of the second and third users.

15. A method, comprising:
receiving, by a first server, a request from a first user to establish a communication session;
determining, by the first server, that an address of record of a second user different from the first user is referenced in a set of contact resolution preferences of the first user;
as part of completing a contact resolution process for the first user, sending a request to establish a communication session to a communication server that is authoritative for the second user; and
sequencing or bypassing one or more applications in a set of contact resolution preferences for the second user based on the address of record of the second user referenced in the contract resolution preferences of the first user, wherein the communication server that is authoritative for the second user and the first server belong to a common domain, wherein the communication server authoritative for the second user analyzes the request received from the first server to determine whether or not to sequence one or more applications defined in the second user's communication preferences, wherein the request comprises an INVITE message, wherein the communication server that is authoritative for the second user analyzes a chaining parameter in the INVITE message, and wherein the chaining parameter in the INVITE message causes the communication server that is authoritative for the second user to bypass at least one application that would be sequenced for the second user except when the second user is listed as a contact resolution preference of the first user.

16. The method of claim 15, wherein the set of contact resolution preferences also define at least one device to be alerted during contact resolution.

17. The method of claim 16, further comprising:
determining a winning device for the contact resolution process for the first user, wherein the winning device corresponds to an alerted device which answers the request first;
establishing a communication session between a communication device operated by the first user and the winning device; and
cancelling requests sent to other devices which are not determined to be the winning device.

18. The method of claim 17, wherein the winning device corresponds to a communication device operated by the second user.

19. The method of claim 18, wherein the winning device is not identified in the set of contact resolution preferences of the first user.

20. A communication server, comprising:
a processor; and
memory including instructions configured to be executed by the processor, thereby causing the server to perform the following:
analyze an INVITE message received from a first user, the INVITE message being directed toward a second user;
analyze contact resolution preferences for the second user;
determine that the contact resolution preferences for the second user identify an address of record of a third user;
perform a contact resolution process for the second user, where during the contact resolution process, at least one of the INVITE and a second INVITE are sent to a communication server that is authoritative for the third user; and
sequencing or bypassing one or more applications in a set of contact resolution preferences for the third user based on the address of record of the third user referenced in the contract resolution preferences of the second user, wherein, during the contact resolution process, a plurality of INVITE messages are sent to a plurality of devices including the communication server that is authoritative for the third user, wherein a device among the plurality of devices that answers the INVITE message first is connected with a communication device operated by the first user to the exclusion of the other communication devices in the plurality of devices, and wherein the INVITE contains a chaining parameter that causes the communication server that is authoritative for the third user to bypass sequencing at least one application that would otherwise be sequenced for the third user.

\* \* \* \* \*